(12) United States Patent
Svirklys et al.

(10) Patent No.: US 7,314,562 B2
(45) Date of Patent: Jan. 1, 2008

(54) FLOATING WETLAND STRUCTURES FOR USE IN WATER REMEDIATION

(75) Inventors: Fred Svirklys, Ontario (CA); Dennis Shanklin, Gaston, SC (US)

(73) Assignee: 3R Foam LLC, Gaston, SC (US)

( * ) Notice: Subject to any disclaimer, the term of this patent is extended or adjusted under 35 U.S.C. 154(b) by 249 days.

(21) Appl. No.: 11/116,499

(22) Filed: Apr. 28, 2005

(65) Prior Publication Data

US 2006/0243659 A1    Nov. 2, 2006

Related U.S. Application Data

(60) Provisional application No. 60/565,995, filed on Apr. 28, 2004.

(51) Int. Cl.
  *C02F 3/32* (2006.01)
(52) U.S. Cl. ............... 210/602; 210/747; 210/903; 210/906; 210/170.05; 210/170.09; 210/242.1
(58) Field of Classification Search .............. 210/602, 210/615, 747, 170.01, 170.05, 170.08, 170.09, 210/242.1, 903, 906; 47/59 R, 59 S, 64
See application file for complete search history.

(56) References Cited

U.S. PATENT DOCUMENTS 3,920,871 A * 11/1975 Johnson .................. 428/54
4,582,609 A * 4/1986 Hunter et al. ............. 210/747
5,207,733 A * 5/1993 Perrin ..................... 47/87
6,558,548 B2   5/2003 Svirklys et al.
6,692,641 B2   2/2004 DeBusk et al.
2002/0139742 A1* 10/2002 Svirklys et al. .......... 210/242.1
2003/0222016 A1   12/2003 Svirklys et al.
2005/0183331 A1* 8/2005 Kania et al. .............. 47/65.5

FOREIGN PATENT DOCUMENTS

GB    1475994   * 6/1977
JP    8-309376  * 11/1996
JP    10-113685 * 5/1998

* cited by examiner

*Primary Examiner*—Fred G. Prince
(74) *Attorney, Agent, or Firm*—Alston & Bird LLP

(57) ABSTRACT

Floating wetland structures of the invention are generally formed from one or more floatation panels made of a plurality of polymeric foam particles arranged in a piled laminate structure. The foam particles are arranged within the piled laminate structure so as to define void pathways between at least a portion of said foam particles. The void pathways within the piled laminate structure are of sufficient size and quantity to allow rainwater to flow through and of such an orientation to allow for the roots of vegetation to easily penetrate the structure.

16 Claims, 4 Drawing Sheets

US 7,314,562 B2

FLOATING WETLAND STRUCTURES FOR USE IN WATER REMEDIATION

CROSS-REFERENCE TO RELATED APPLICATIONS

This application claims the benefit of U.S. Provisional Application No. 60/565,995, filed Apr. 28, 2004.

FEDERALLY SPONSORED RESEARCH OR DEVELOPMENT

The research underlying this invention may have been supported in part with funds from the United States Department of Agriculture, under Cooperative Research and Development Agreement (CRADA) No. 58-3K95-M-1021. The United States Government may have an interest in the subject matter of this invention.

FIELD OF THE INVENTION

The present invention relates to floating wetlands structures. More particularly, the invention relates to structures that are capable of floating atop bodies of water and capable of providing a basis for vegetative growth.

BACKGROUND OF THE INVENTION

Evolving environmental regulations and sensitivities provide a constant impetus to provide improved waste management systems and techniques. In particular, there is a call for improved methods of treating ground water, open bodies of water, and wetlands. Presently, agricultural practices account for the largest single contribution to non-point source pollution. Run-off from cropland, pastures, feedlots, and farmsteads continues to add substantial inputs of nitrogen and phosphorus to the nation's waterways and groundwater.

Wetlands, both natural and constructed, have been shown to be capable of remediating contaminated water, such as water from agricultural runoff or animal wastewater. The use of artificially constructed wetlands to retain and remove pollutants is steadily increasing. New applications, technological enhancements, and geographical dispersion of constructed wetlands are occurring. These systems are categorized into two basic types of constructed wetlands, Free Water Surface (FWS) systems and Subsurface Flow (SSF) systems. These wetland systems have been shown to be successful in the treatment of water.

For domestic wastewater treatment, the pollutants of most concern that may be treated with wetland systems exhibit undesirable total suspended solids (TSS), biochemical oxygen demand (BOD), total phosphorous (TP), total nitrogen (TN), and/or fecal coliform. Constructed wetlands may be particularly useful in lowering ammonia and nitrogen concentrations in water from agriculture. Nitrogen transformations in wetlands are a complex assortment of processes mediated by microbes, including nitrification, denitrification, nitrate reduction, and nitrogen fixation. In nitrification, ammonia is oxidized to nitrite, which is subsequently oxidized to nitrate. Different microorganisms are involved in each of these steps. The organisms that convert nitrite to nitrate are typically faster than the microbes that convert ammonia to nitrite. Nitrates and nitrites are reduced by bacteria to yield nitrous oxide and nitric oxide in a process known as denitrification.

Nitrous and nitric oxides within the water are further reduced to harmless nitrogen gas by surface vegetation. Elimination of the nitrogen oxides alters the ammonia-nitrogen equilibrium within the wetland system and indirectly causes increased nitrification of ammonia. Surface vegetation that is particular adapted for wetland conditions and provides good conversion of nitrogen oxides to nitrogen include such plants as cattails and bulrush.

Artificial wetlands are preferably constructed on flat or slightly-sloping landscapes where the water table consistently resides slightly above or slightly below the surface of the soil. However, there are many circumstances when relatively flat terrain is unavailable and wastewater must be contained in ponds or lagoons. Surface vegetation cannot grow in the depths of such ponds and lagoons, therefore conversion of nitrogen oxides to free nitrogen is impeded. Soil, sand, or gravel berms could be created in order to provide a basis for the surface vegetation, but construction of large berms is expensive and labor intensive.

There is a need to provide a basis for the growth of wetland surface vegetation in, on, or around wastewater lagoons such that surface vegetation may be adequately maintained within the wetland system to provide for elimination of nitrogen oxides. It is further desired to provide a basis for the growth of surface vegetation that is economical, easily constructed, and easy to maintain.

SUMMARY OF THE INVENTION

The present invention provides floating wetland structures that enable the growth of surface vegetation upon the surface area of relatively deep lagoons or reservoirs that would otherwise be unable to support surface vegetation. By providing a floating surface that is compatible with wetland vegetation, the floating structures of the invention increase the amount of vegetation within the wetland system and thereby increase the elimination of nitrogen oxides from the water and soil of the system. The wetland structures are porous such that surface vegetation may root through the structures without disturbing the structural integrity of the structures. As a further result of being porous, the structures allow rainwater to readily pass through, thereby avoiding inundation during storms and the like. The structures are capable of holding soil, peat moss, or other growth medium upon their surface, and simultaneously prevent such growth medium or other debris from entering the underlying water. The wetland structures of the invention are further durable, economical and easily installed.

The wetland structures of the invention are generally formed from one or more floatation panels. The floatation panels include a plurality of polymeric foam particles arranged in a piled laminate structure, the piled laminate structure defining a first face and an opposing second face. At least a portion of the polymeric foam particles within the piled laminate structure are bonded to at least one adjoining foam particle positioned either above or below the foam particle, and the foam particles are arranged within the piled laminate structure so as to define interstices between at least a portion of said foam particles. The interstices within the piled laminate structure are of sufficient size and quantity to allow rainwater to flow through and of such an orientation to allow for the roots of vegetation to easily penetrate the panel from the first face to the second face of the panel.

Exemplary materials from which to form the polymeric foam particles include one or more polymers selected from polyolefin, polyvinyl acetate, and polyurethane. Advantageously, the polymeric foam particles have a diameter in the range of from about 0.25 to 3.0 inches. The polymeric foam particles can be bonded by any means, including thermal bonding, needlepunching, stitching and chemically binding. Advantageously, the polymeric foam particles are thermally bonded.

Floatation panels in accordance with the invention may be relatively thin. For example, the floatation panel may have a thickness between the first and second face from about 7 to 250 mm. In particularly advantageous embodiments, the floatation panel may have a thickness of about 10 to 40 mm, such as a thickness of about 20 to 28 mm. The floatation panels are further relatively dense. For example, the floatation panels of the invention typically exhibit a density of about 1.5 to 20 $lb/ft^3$, such as a density of about 10 to 16 $lb/ft^3$, particularly about 12 to 15.5 $lb/ft^3$. Although relatively dense, the floatation panels remain quite buoyant. Floatation panels of the invention typically exhibit buoyancies of from about 40 to 60 $lb/ft^3$.

As noted above, the wetland structures are generally formed from one or more floatation panels. Multiple panels may be joined together using an optional fabric layer bonded to at least a portion of the first face of the panels or by other means, such as cables. A fabric layer can be formed from one or more fibers selected from polyester, nylon, glass, acrylic, flax, and polyolefin. The fabric layer is advantageously formed from fiber having a denier ranging from about 10 to 45. The fabric layer may have any construction. In beneficial embodiments the fabric layer is a nonwoven fabric. Exemplary fabric layer weights typically range from about 3 $oz/yd^2$ to 50 $oz/yd^2$. In advantageous embodiments, the floatation panel includes a second fabric bonded to at least a portion of the second face.

The invention further includes wetland systems, including engineered wetland systems, that include the beneficial floating wetland structures of the invention. The wetlands system generally includes a reservoir, lagoon, pond, or other water containing formation, and a floating wetland structure floating upon at least a portion of the surface of the reservoir. The water reservoir system can further include an anchor to secure the wetland structure to the shoreline of the reservoir. In beneficial aspects of the invention, the wetland structure may be secured to the bottom of the lagoon so as to remain stationary within the lagoon. One or more of the floating panels may be used on the surface of each of one or more lagoons. Vegetation is loaded upon the top of the wetland structure and, once established, vegetation upon the structures may be self-sustaining and live perpetually upon the structure.

The present invention also encompasses methods of remediating contaminated water, which generally includes supplying contaminated water to a wetland system reservoir that includes at least one of the invented structures with a vegetative top cover and allowing sufficient residence time of the wastewater such that the vegetation upon the structure may clean contaminants from the water. Contaminants in the water are absorbed by the roots of the surface vegetation, bio-chemically altered by the natural processes of the vegetation and expelled as harmless byproducts. In the case of ammonia and nitrates, byproducts are expelled as harmless nitrogen gas.

DETAILED DESCRIPTION OF THE INVENTION

The present invention now will now be described more fully hereinafter with reference to the accompanying drawings, in which advantageous embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
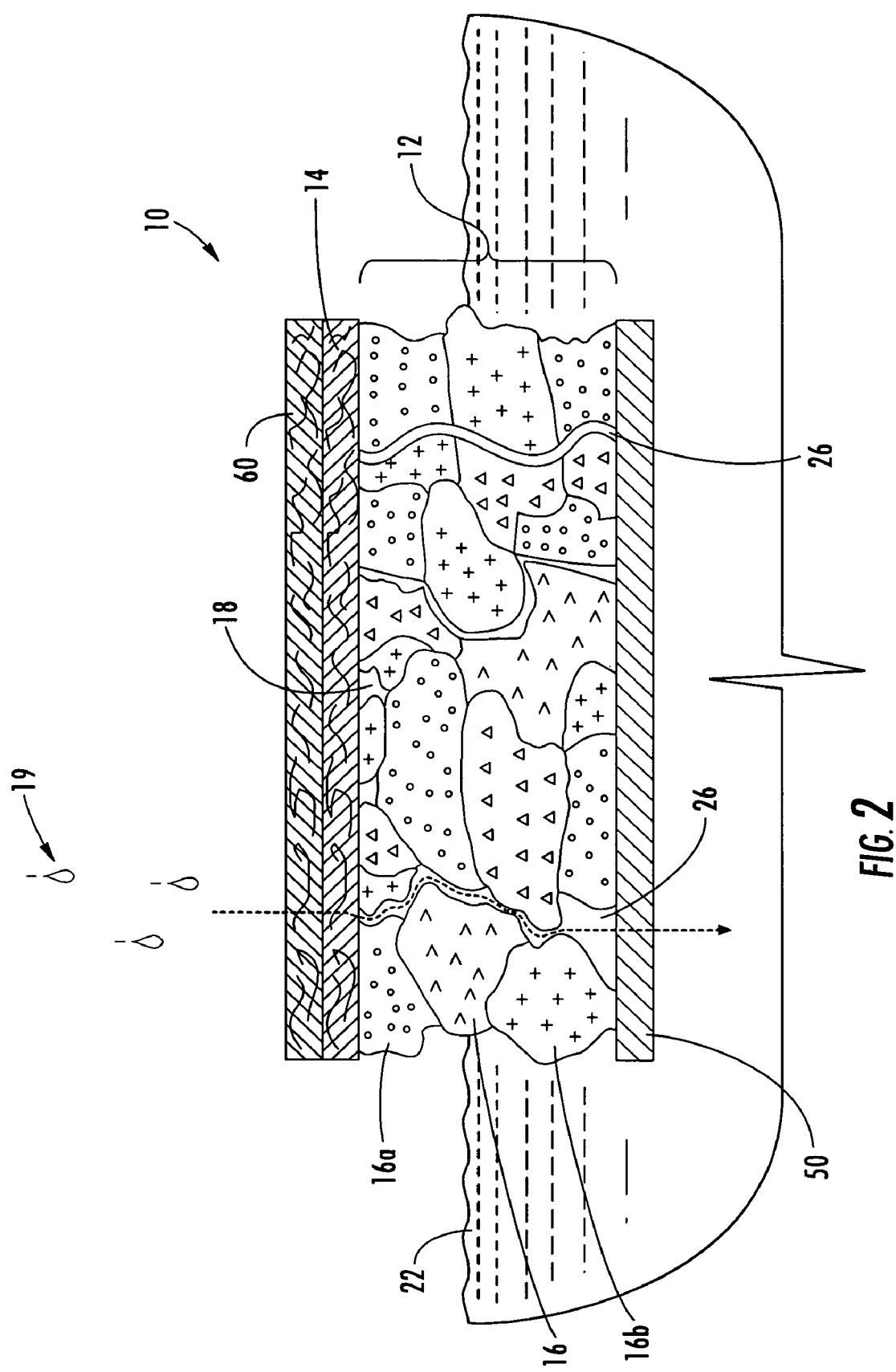
FIG. 2 illustrates a greatly enlarged schematic cross sectional view of one embodiment of the wetland structure of the present invention.

FIG. 2 provides a grossly enlarged cross sectional view of a section of an exemplary structure 10 suitable for use in the present invention. In general, the floatation panel 12 portion of the structure 10 is formed from foam particles 16 of various sizes, shapes and densities that have been bonded together to provide a cohesive structure. Further, the foam particles 16 forming the floatation panel 12 are typically randomly arranged into a piled laminate structure.

The foam particles 16 that form the floatation panel 12 generally range in size from about 0.10 to 3.0 inches, and preferably from about 0.25 to 3.0 inches. In one beneficial embodiment, the foam particles 16 have an average diameter of about 1.0 inch. As used herein, the "particle size" refers to the average diameter of the foam particles 16 determined at ambient conditions, i.e. at atmospheric pressure and room temperature, prior to their incorporation into the floatation panel 12. The foam particles 16 may have any shape, and in advantageous embodiments a variety of shaped foam particles 16 are included in the floatation panel 12.

Any suitable polymeric foam can be shredded or chopped to form the foam particles 16. Exemplary foams include any thermoplastic, thermoset or engineered foam. Suitable foams for use in the invention include polyolefin foams, including polyethylene and polypropylene foams, ethylene vinyl acetate foam, and polyurethane foam. As used herein, the term "polyethylene" encompasses low density, linear low density, and high density polyethylene. A majority of the polymeric foam particles 16 should be formed from closed cell foams to provide sufficient buoyancy. Advantageously, from 90% to 100% of the polymeric foam particles 16 are formed from closed cell foam. In one particularly advantageous embodiment closed cell foam formed from polyethylene is employed.

The foam particles 16 can further be formed from cross-linked foam to enhance its strength, chemical resistance, weather resistance and durability. Advantageously, from about 50 to 100% of the polymeric foam particles 16 are cross-linked, such as amounts ranging from about 90 to 100%. In one advantageous aspect of the invention, the foam particles 16 are formed from cross-linked polyethylene foam. In a further beneficial embodiment, the foam particles 16 are formed from cross-linked closed cell polyethylene foam. The foam particles may further be formed from recycled polymer, such as closed cell recycled polyethylene foam.

An exemplary polyethylene foam construction for use as a floatation panel 12 of the present invention is available commercially from 3R-Foam, Inc. of Gaston, S.C. and Sirex Engineering of Mississauga, Ontario Canada as 3RD50™, 3RD35™, 3RD25™, and 3RD15ACPET™ foams.

The foam particles 16 within the floatation panel 12 are bonded together to provide a cohesive structure. More particularly, the floatation panel 12 is advantageously durable, e.g. able to withstand the elements, such as rain, snow, hail and the like. To provide a cohesive structure, at least a portion of the foam particles 16 within the floatation panel 12 are bonded to at least one adjoining foam particle positioned either above or below them, as illustrated in FIG. 2 as 16*a* and 16*b*, respectively. At least a portion of the foam particles 16 within the floatation panel 12 are also bonded to at least one adjoining foam particle positioned beside them, as further illustrated in FIG. 1 as 16*c* and 16*d*, respectively. In beneficial embodiments, substantially all of the foam particles 16 within the floatation panel 12 are bonded to at least one adjoining foam particle positioned either above, below or beside them, as further illustrated in FIG. 1 as 16*a* through 16*d*, respectively.

However, although at least a portion of the individual foam particles 16 are bonded together, sufficient void spaces 18 are present between the foam particles 16 to ensure that the floatation panel 12 provides suitable liquid transport, i.e. the rainwater 19 striking the surface of the floatation panel 12 is transported through the thickness of the panel to the reservoir water 22 at an adequate rate. Stated differently, sufficient void spaces 18 remain between at least a portion the foam particles 16 to avoid inundation of the structure 10 during rainstorms and the like. To provide adequate liquid transport properties to the structure 10, the floatation panels 12 typically exhibit a water permeability of greater than $1.2 \times 10^{-1}$ m/s in the vertical direction.

The foam particles 16 of the floatation panels 12 are assembled in such a manner that, in at least some locations within the foam, the void spaces 18 between the individual foam particles 16 combine to form continuous void pathways 26 that extend from the upper surface to the lower surface of the floatation panels 12. Due to the nature of the foam particle construction of the panels, the void pathways 26 do not form a linear path from top to bottom. Rather, the pathways 26 are somewhat serpentine as illustrated in FIG. 2. It should be noted that the serpentine pathways 26 are three-dimensional voids formed between individual foam particles within the volume of the floatation panel 12 and are not necessarily limited to the two-dimensional orientation shown in FIG. 2. In addition to the void pathways 26 resulting from bonding of the foam particles 16, additional holes may be placed into the panel 12 after formation. Such holes do not necessarily have the serpentine orientation of the void pathways 26.

The void pathways 26 generally have an irregularly-shaped cross-section. The average width of the cross-section is from about 2 mm to about 10 mm, preferably about 5 mm, and typically varies along the length of the pathway 26. The cross-sections of the pathways 26 are large enough that roots from surface vegetation planted upon the foam structure may grow downward through the floatation panel 12 via the void pathways 26. The void pathways 26 allow roots to freely penetrate the floatation panel 12 without damaging the panel. Once roots have penetrated the panel 12, the roots can absorb contaminated water from underneath the structure 10. The contaminated water is then naturally transported to the overlying vegetation where it is cleaned by the biochemical processes of the plant.

Buoyancy is one indication of the quantity and size of the void spaces present within the floatation panel, with higher buoyancies indicating lesser amounts of and/or smaller void spaces. Applicants have found that floatation panels characterized by area buoyancies capable of supporting from about to 1.5 to 6 lb/ft$^2$ (corresponding to a thickness of about 15 mm to about 50 mm), such as area buoyancies ranging from about 2.5 to 5.0 lb/ft$^2$ (corresponding to a thickness of about 25 mm to about 45 mm), preferably from about 2.8 to 3.8 lb/ft$^2$ (corresponding to a thickness of about 30 mm to about 35 mm), are advantageous. These area buoyancies translate on a per volume basis (either on a bulk volume or displaced volume basis) to volume buoyancies ranging from about 35 to 60 lb/ft$^3$, such as volume buoyancies ranging from about 40 to 60 lb/ft$^3$, preferably from about 40 to 55 lb/ft$^3$.

The structures 10 of the invention thus float on the surface of the reservoir water 22, and hence do not require a separate support system. To ensure sufficient buoyancy, at least a portion of the foam particles 16 forming the floatation panels 12 have a density less than the liquid of the reservoir. More particularly, at least a portion of the foam particles 16 exhibit a sufficient density to enable the foam particles 16 to collectively float the floatation panel 12 and provide sufficient buoyancy. The structures 10 of the invention generally range in density from about 1.5 to 20.0 lb/ft$^3$, such as from about 2.5 to 18.0 lb/ft$^3$, preferably from about 4.0 to 46.0 lb/ft$^3$.

As indicated in FIG. 2, the structure 10 may further include a fabric layer 14. The fabric layer 14 is typically adhered to the floatation panel 12 on the surface opposing the reservoir water 22, and may be employed to bond two or more floatation panels 12 into a unitary structure. Optionally, a fabric layer may be added to the surface of the floatation panel 12 to be contacted with the water 22.

The fabric layer 14 may be formed from any suitable fabric construction. Exemplary fabric constructions include nonwoven, woven, knit, and net constructions. In one beneficial embodiment, the fabric layer 14 can be formed from nonwoven fabric, particularly spunbond nonwoven fabric. The fabric layer 14 can advantageously range in weight from about 3 to 30 oz/yd$^2$.

The fabric layer 14 is also advantageously durable, e.g. able to withstand the elements, such as sunlight, rain, snow, hail and the like. Further, the fabric layer 14 should have a permeability and diffusivity sufficient to allow rainwater 19 to pass through. The fabric layer 14 should also provide a sufficient amount of flexibility, to allow sections of the structure 10 to be folded back on itself if desired, such as during installation or removal. The fabric layer 14 further typically exhibits both a puncture strength of at least 150 pounds as measured via ASTM D4833 and a trap tear strength of at least 65 pounds, as measured via ASTM D4533.

In an alternate beneficial embodiment, the fabric layer 14 is a needle-punched nonwoven fabric. The fabric layer 14 may be formed from any weather resistant synthetic or natural fiber. Exemplary fibers from which to form the fabric layer 14 include polyester, nylon, acrylic, flax, polyolefin, including polypropylene, and polyethylene, glass fiber or any other melt spinnable fiber, and mixtures thereof. In one advantageous embodiment, the fabric layer 14 is formed from polyester fiber, particularly UV resistant polyester such as polyester that has been filled with carbon black. In a further advantageous embodiment, the fabric layer 14 is formed from acrylic fiber, either alone or in conjunction with polyester or other fiber.

The fabric layer 14 may further be formed from either staple or continuous filament fiber. In beneficial embodiments, the fabric layer 14 is formed from fiber having a denier ranging from about 10 to 45 denier. The overall fabric layer 14 weight generally ranges from about 5 to 30 oz/yd$^2$, such as a fabric weight ranging from about 7 to 10 oz/yd$^2$, most preferably about 7 oz/yd$^2$. The fabric layer 14 may further be coated with a UV resistant coating, such as an acrylic coating. The fabric is preferably a relatively wide weave, such as over 20 mesh. The wide weave of the fabric allows for vegetation to more easily root through the fabric layer 14 or to sprout through the fabric layer 14.

The floatation panels 12 can be bonded to the fabric layers 14 using any suitable technique. As noted previously, the fabric layer 14 may be adhered to the panel 12 during the floatation panel manufacturing process. Alternatively, adhesive may be used to attach the fabric layer 14 to the floatation panel 12. The adhesive is beneficially selected and applied in a manner that is not detrimental to the gas diffusion and liquid transport properties of the floatation panels 12. For example, the adhesive may be applied in a discontinuous pattern. The adhesive can be any suitable weather resistant adhesive. Advantageously, cross-linked polyurethane adhesive can be employed. The adhesive is further advantageously applied in an amount sufficient to prevent adhesive failure between the fabric layer 14 and the floatation panel 12.

The structure 10 optionally comprises a layer of solid growth medium 60. The growth medium is any soil or organic material that promotes the growth of surface vegetation. Most typically, a layer 60 of peat moss is placed above the floatation panel 12 and forms the upper layer of the structure 10 (except for any vegetation). The layer 60 may consist of, for example, top soil, peat moss, sand, gravel, mulch, straw, or other materials or combinations of materials that may be used to support vegetative growth. The composition of the medium 60 will depend on various conditions such as climate, rainfall, type of vegetation to be grown, etc. Mediums suitable for particularly vegetation and climate are known in the art of wetlands management. The layer 60 may be any thickness and is favorably from about 0.5 inch to about 12.0 inches, preferably about 1.0 inch to about 3.0 inches in depth. The layer 60 may be installed directly upon the floatation panel 12 or upon the optional upper fabric layer 14.

The structure 10 optionally has a treated wood or other rigid support member 50 affixed to at least a portion of a surface of the structure 10. The purpose of the support member 50 is several fold. First, the support member serves to rigidize the structure 10 and provide strength against lateral forces and impact. Also, the support member 50 provides a basis for an anchoring mechanism 70 that may be attached to a cable and anchor in order to hold the structure 10 in a stationary position. The support member may be attached directly or indirectly to the floatation panel 12 in any number of ways, such as by placing a threaded rod through the panel 12 and member 50 and securing a large-diameter washer and nut to each side of the rod, or by adhesively bonding the support member 50 to the floatation panel 12. The support member 50 is typically affixed to the lower surface of the floatation panel 12, but may alternatively be affixed to the top surface of the floatation panel or to both surfaces of the floatation panel 12. According to one embodiment, a wetland structure 10 has a support member 50 positioned on both the upper and lower surfaces of the floatation panel 12 and the support members are fastened to one another, through the foam of the floatation panel 12.

Support members 50 may optionally be positioned about the periphery of the wetland structure 10, i.e. on the sides of the structure 10.

The floatation panel 12 may be formed by bonding the foam particles 16 together using a variety of techniques, including thermal bonding, needle punching, stitching, adhesives (also referred to as "chemically binding"), ultrasonic bonding, UV curing and the like.

In one advantageous embodiment, the foam particles 16 within the floatation panel 12 may be thermally bonded using a pair of platens supplying heated air, for example super heated air. In this advantageous embodiment, a layer of foam particles is piled in a random manner atop a first platen. The surface of the first platen supporting the layer of foam provides an array of holes to transport heated air into the layer of foam particles 16. In advantageous embodiments, the fabric layer 14 described above is placed between the first platen and the foam particles 16 prior to heating. In such advantageous embodiments, the fabric layer 14 is thermally bonded to the floatation panel 12 during the floatation panel 12 manufacturing process. To complete the floatation panel 12, a second platen, similarly defining an array of holes suitable to transport heated air, is then brought into contact with the opposing surface of the layer of foam particles.

A sufficient amount of heated air is subsequently introduced through the platens to soften and bond the foam particles. The heated air is provided at a temperature suitable to soften the surface of the foam particles without inducing degradation. The top platen further applies sufficient pressure to the foam particles during the bonding process to produce the desired foam density, particularly the desired immersion density. In an alternative embodiment, textile materials may be bonded to the top of the floatation panel 12.

In a further alternative advantageous embodiment, at least a portion of the foam particles 16 are bonded using stitching or needlepunching. For example, foam particles can be piled in a random manner atop a first textile material, such as a nonwoven fabric. A second textile material, for example a second nonwoven fabric, may then be positioned over the top of the layer of foam particles. Exemplary fabric weights for the first and second textile material may range from about 4 to 30 oz/yd$^2$. Conventional needlepunch equipment, such as a two bed needlepunch commonly used in the production of nonwoven fabric, may then be employed to bind the foam particles and fabric into a cohesive structure. Yarns or filaments may further be inserted through the thickness of the layer of foam particles and the textile materials during the needlepunch process. Suitable textile materials for use in these aspects may be formed from any environmentally resistant fiber. Similarly, the inserted yarns or filaments may be formed from any environmentally resistant fiber. Exemplary environmentally resistant fibers include polyester, nylon, acrylic, flax, polyolefin, including polypropylene and polyethylene, and glass fiber or any other melt spinnable fiber, and mixtures thereof. Polyester may also advantageously be employed, particularly UV resistant polyester, such as carbon black filled polyester.

Figure 1:
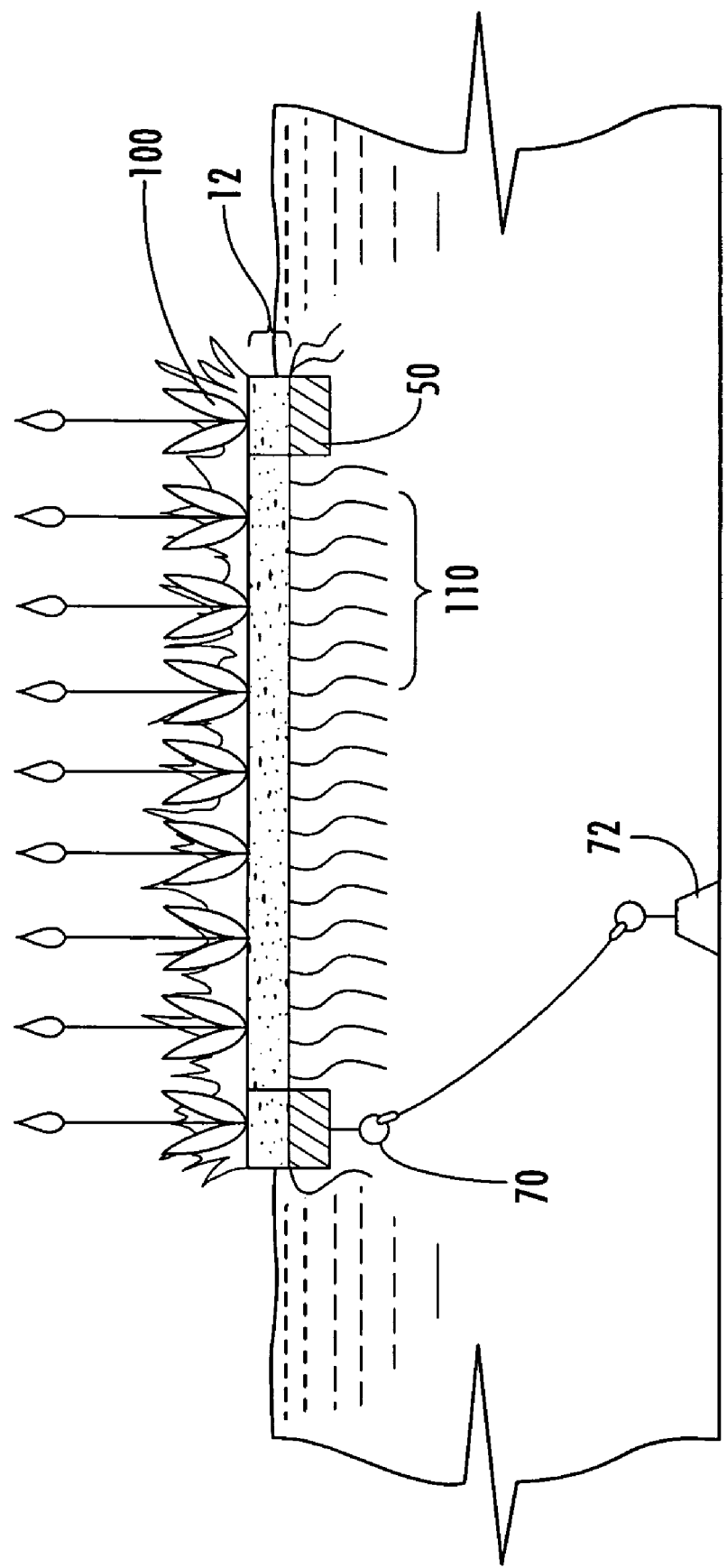
FIG. 1 illustrates a side perspective view of one advantageous embodiment of the wetland structure of the present invention.

The wetland structure 10 may be installed in many different configurations. An exemplary installation is shown in FIG. 1. Referring to that Figure, the illustrated structure 10 comprises a floating panel 12 of uniform thickness and two rigid support members 50. One of the support members 50 is attached to an anchoring member 70 which, in turn, is attached to an anchor 72.

The floating panel 12 is of uniform thickness, and an exemplary thickness is about 1.0 inch. The area of the panel may be of any shape, but is typically a rectangle. The square area of the panel may be of any magnitude, depending on the amount of vegetation to be planted and the area of the lagoon available. For ease of transportation and installation, panels are typically made is sections of about 4 feet by 8 feet.

Vegetation 100 is installed upon the floating panel 12. The vegetation may be loaded upon the panel before or after the panel is put in place within the lagoon. The panel is preferably loaded after it has been placed in the water. By way of example, vegetation such as broad-leaf cattail seedlings is loaded directly upon the foam panel 12, under a layer of peat moss.

Once the structure is loaded with vegetation and placed upon the water to be treated, the voids within the foam act to wick water up to the vegetation. Also, if the plants have roots, those roots extend downward through the voids in the foam as discussed above and eventually reach the underlying water. Roots 110 that extend into the water transport the water directly to the vegetation of the structure.

Figure 3:
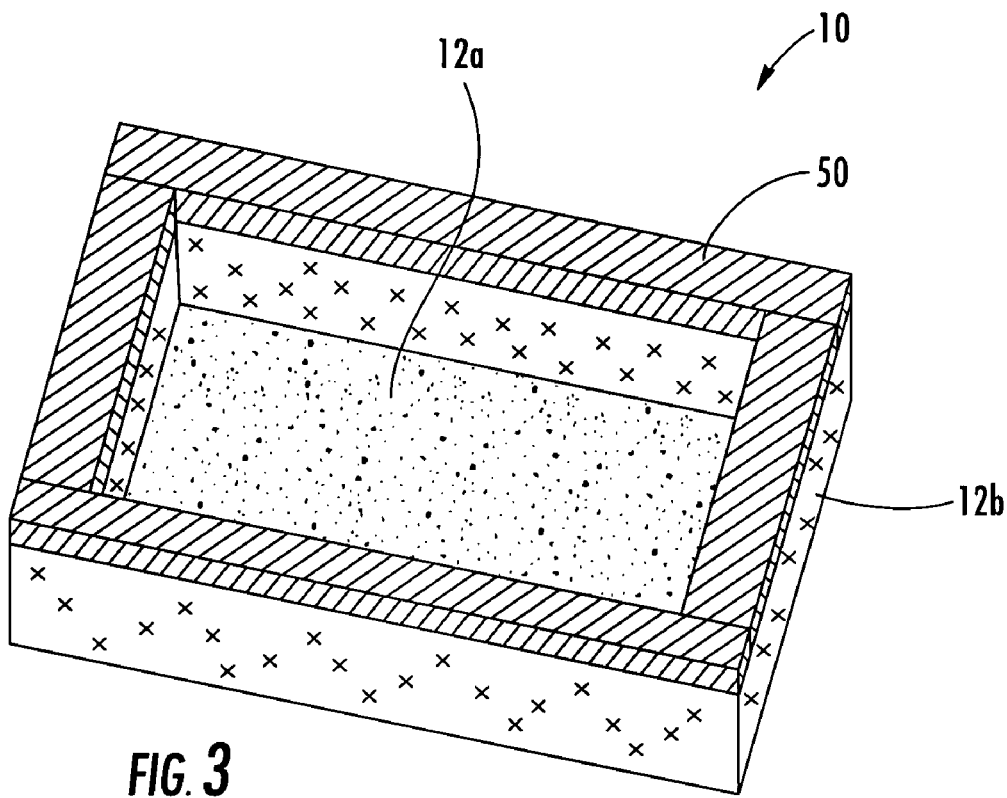
FIG. 3 illustrates a bottom perspective view of an embodiment of the wetland structure of the present invention having a central foam region of a first thickness and a peripheral foam thickness of a second thickness greater than the first thickness.

Referring to FIG. 3, another embodiment of the invention is shown in which the structure 10 comprises a main floatation panel 12a having a first thickness with a periphery 12b having a second thickness greater than the first thickness. The first thickness 12a is such that the internal area of the panel is relatively thin to provide for good hydration of the vegetation by efficient wicking of water from underneath the panel and also to enable root systems of the vegetation to more easily penetrate the panel. The second thickness 12b of the periphery of the panel is such that extra buoyancy is created around the panel to keep the structure 10 afloat. A rigid support member 50 may be installed around the periphery of the structure 10 to provide extra strength to the structure.

Figure 4:
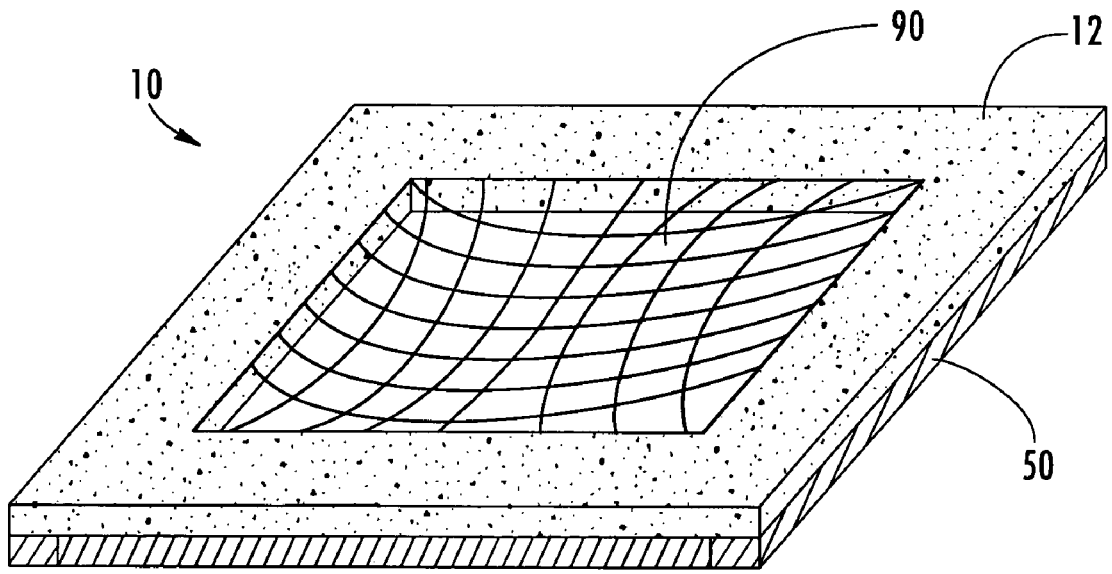
FIG. 4 illustrates an upper perspective view of an embodiment of the wetland structure of the present invention having an open central area with webbing installed therein.

Referring to FIG. 4, an alternative embodiment of the invention is shown in which a floatation panel 12 and associated rigid support member 50 form the periphery of the wetland structure 10 and the center of the structure 10 has an open aperture through the thickness of the central area of the structure. Webbing 90 is placed over the open aperture and secured to the periphery of the structure. The webbing may be of various materials and mesh sizes, but preferably has a mesh size of about 1 inch. Larger vegetation that is capable of surviving in direct contact with the water without soil or other growth medium may be placed upon the mesh 90. These plants are supported and kept from sinking by the mesh and are contained within the panel periphery.

Figure 5:
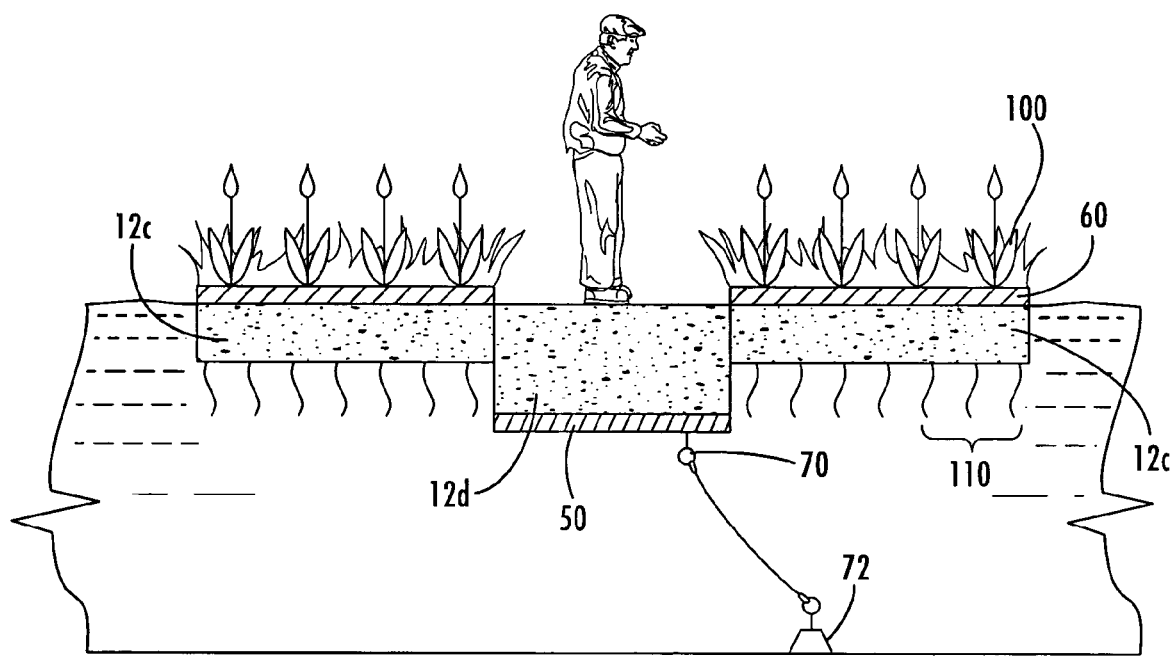
FIG. 5 illustrates a side perspective view of an embodiment of the invention wherein multiple wetland structures are arranged to provide a wetland system having a walkway.

Referring to FIG. 5, a particularly advantageous embodiment of the invention is shown in which alternating sections of floatation panels 12. In this embodiment, at least one of the panels is a loaded panel 12c, meaning that the panel is designed to support vegetative growth, and at least one of the panels is a walkway panel 12d. In this arrangement, loaded panels 12c are designed to support vegetative growth while walkway panels 12d are designed to support humans and maybe lightweight equipment used in the maintenance of the wetland structure 10. In practice, several of the panels may be alternated so as to form a wetland structure system of large surface area while providing easy access to the vegetation of the structure system for ease of maintenance and monitoring.

In a variation of the embodiment of FIG. 5, the wetland structure 10 may be secured to a shoreline such that the walkway panel 12d is in contact with the shore. This allows for the easy maintenance of the structure without the need to carry supplies across water. The structure 10 may be secured to shore using pins, anchor trenches, stakes, cables, etc.

Regarding vegetation that may be used with the wetlands structures, a wide variety of rooted plants may be used and selection of the plants will be based upon such design considerations as hydraulic loading rates, retention time, and effluent characteristics, i.e. content of nitrates, nitrites, ammonia, phosphates, suspended solids, BOD5, coliform bacteria, heavy metals, and any other contaminants of interest.

Many types of plants known in the art of wastewater management and wetlands management are effective for use with the invention. By way of example, broad-leaf cat-tail (*Typha latifolia*) displays great vigor and softstem bulrush (*Scirpus validus*) has strong pollutant removal performance. Both the broad-leaf cattail and the softstem bulrush exhibit good tolerance to increased ammonia-nitrogen loading in the underlying water. Narrow-leaf cat-tail (*Typha angustifolia*), three-square bulrush (*Scirpus acutus*), and common reed (*Phragmites australis*) may also be used but may not be as tolerant to high ammonia concentrations.

The floatation panels 12 may be provided in any suitable shape. In one beneficial embodiment, the floatation panels are rectangular in shape, such as an approximately 39 inches wide by 88 inches long rectangle. Alternatively, the floatation panel 12 may be provided as a wide web roll good, such as a roll ranging from about 24 to 100 inches, particular from about 48 to 96 inches. In such advantageous aspects, the roll goods may have any length known in the art of wide web goods, such as a length ranging from about 40 to 300 feet, particularly from about 50 to 200 feet. The fabric layer 14 may further be advantageously bonded to the floatation panel 12 during floatation panel manufacture in such roll goods aspects.

The floatation panels 12 suitable for use in the present invention typically range in thickness from about 7 to 250 mm, such as from about 10 to 40 mm. In advantageous embodiments, the floatation panel 12 is approximately 20 to 28 mm thick.

The floatation panels 12 typically exhibit a tensile strength of greater than about 9 k/nm. The floatation panels 12 further generally exhibit an ultimate elongation of about 575%, a compressive creep at a dynamic load of 1,235 lb/ft$^2$ of about −25% and a surface hardness ranging from about 20 to 40 shore A, such as a surface hardness ranging from about 30 to 40 Shore A.

The wetland structures may be placed and installed as other floating docks and panels. For example, a suitable anchor may be attached to the structure with an attachment line of suitable length, and the anchor may be lowered to the bottom of the lagoon after the structure has been placed in the desired location. Alternatively, the structure may be attached to a piling. Alternatively, the structure may be allowed to remain free-floating, such as in relatively smaller lagoons. Several structures 10 may be attached together, such as by cables or by the use of common anchors.

The wetland structure is advantageously installed in a wastewater lagoon or other water reservoir where the throughput of water is low enough to allow adequate treatment of the water. Inlet to the lagoon may be provided by runoff or by dedicated piping. Outlet from the lagoon is advantageously provided to provide for a gradual flow of water through the lagoon. Alternatively, no outflow is provided and water dissipates primarily by evaporation.

Among their many beneficial attributes, the structures 10 of the present invention are generally highly buoyant. The structures 10 are further puncture and generally wind resistant, i.e., the structures 10 do not shift or substantially move in response to wind sweeping across the reservoir surface.

Many modifications and other embodiments of the invention set forth herein will come to mind to one skilled in the art to which this invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A floating wetland structure comprising:
    one or more floatation panels, each floatation panel comprising a plurality of polymeric foam particles arranged in a piled laminate structure,
    wherein said piled laminate structure further defining a first face and an opposing second face;
    wherein at least a portion of said polymeric foam particles within said piled laminate structure are bonded to at least one adjoining foam particle positioned either above or below said foam particle; and
    wherein said foam particles are arranged within said piled laminate structure so as to define a plurality of void pathways between at least a portion of said foam particles, said void pathways defined continuously from said first face to said second face of the laminate structure, wherein the void pathways have irregularly-shaped cross-sections having an average width of from about 2 mm to about 10 mm.

2. The floating wetland structure of claim 1, wherein the floatation panel has a water permeability of greater than $1.2 \times 10^1$ m/s through the thickness of the panel.

3. The floating wetland structure of claim 1, further comprising holes defined from the first face to the second face of the floatation panel in addition to the void spaces.

4. The floating wetland structure of claim 1, wherein the floatation panels have a volumetric buoyancy of from 35 to 60 lb/ft$^3$.

5. The floating wetland structure of claim 1, further comprising a fabric layer adhered to at least one surface of the floatation panel.

6. The floating wetland structure of claim 1, further comprising a layer of growth medium applied to a face of the floatation panel.

7. A floating wetland system comprising:
    at least one floatation panel, said floatation panel comprising
    a plurality of polymeric foam particles arranged in a piled laminate structure, at least a portion of said polymeric foam particles within said piled laminate structure bonded to at least one adjoining foam particle positioned either above or below said foam particle;
    said piled laminate structure further defining a first face and opposing second face,
    wherein at least a portion of said foam particles exhibit sufficient buoyancy to collectively float said floatation panel in a water reservoir, said foam particles further arranged within said piled laminate structure so as to define void pathways between at least a portion of said foam particles, said pathways of sufficient size and quantity to allow rainwater to flow through said piled laminate structure and further allowing roots of surface vegetation to penetrate said piled laminate without destruction of the floatation panel; and
    vegetation installed upon a face of the floatation panel.

8. The floating wetland system of claim 7, wherein the vegetation comprises plants selected from the group consisting of broad-leaf cattail, narrow-leaf cattail, softstem bulrush, three-square bulrush, common reed, and combinations thereof.

9. The floating wetland structure of claim 8, wherein the vegetation is planted within a layer of growth medium upon a face of the floatation panel.

10. A water remediation system comprising:
    a water reservoir containing water having at least one contaminant; and
    a floating wetland structure spanning at least a portion of the surface of said water reservoir, said floating wetland structure comprising
    at least one floatation panel, said floatation panel comprising a plurality of polymeric foam particles arranged in a piled laminate structure, at least a portion of said polymeric foam particles within said piled laminate panel bonded to at least one adjoining foam particle positioned either above or below said foam particle, said piled laminate panel further defining a first face and opposing second face;
    wherein at least a portion of said foam particles exhibit sufficient buoyancy to collectively float said floatation panel in said water reservoir, said foam particles further arranged within said piled laminate panel so as to define void pathways between at least a portion of said foam particles, said pathways of sufficient size and quantity to allow rainwater to flow through said piled laminate panel and further allowing roots of surface vegetation to penetrate said piled laminate panel without destruction of the panel; and
    vegetation installed upon a face of the floatation panel.

11. The system of claim 10, wherein the vegetation is rooted through at least a portion of said polymeric foam particles.

12. The system of claim 10, wherein the contaminant comprises at least one of total suspended solids (TSS), biochemical oxygen demand (BOD), total phosphorous (TP), total nitrogen (TN), and fecal coliform.

13. A method of remediating contaminated water comprising:
    placing a floating wetland structure upon at least a portion of the surface area of a reservoir that contains contaminated water, the wetland structure comprising
    at least one floatation panel, comprising
    a plurality of polymeric foam particles arranged in a piled laminate structure, at least a portion of the polymeric foam particles within the panel bonded to at least one adjoining foam particle positioned either above or below the foam particle, the panel further defining a first face and opposing second face, the first face contacting the water reservoir at or near its surface;
    wherein at least a portion of the foam particles exhibit sufficient buoyancy to collectively float the panel, the foam particles further arranged within the panel so as to define void pathways between at least aportion of the foam particles, the void pathways of sufficient size and quantity to allow rainwater to flow through the panel and further allowing roots of surface vegetation to penetrate said panel without destruction of the floatation panels;

installing the wetland structure upon the surface of contaminated water; and maintaining vegetative growth upon the upper surface of the wetland structure.

14. The method of claim 13, wherein the vegetation of the upper surface of the wetland structure is rooted through at least a portion of said plurality of polymeric foam particles.

15. The method of claim 13, wherein the contaminated water is held within a wastewater lagoon.

16. The method of claim 15, further comprising the step of providing a gradual flow of wastewater through the lagoon.

* * * * *